US006659041B1

United States Patent
Curts

(10) Patent No.: US 6,659,041 B1
(45) Date of Patent: Dec. 9, 2003

(54) DECORATIVE BIRD FEEDER

(75) Inventor: Jonathan D. Curts, Parker, CO (US)

(73) Assignee: Perky-Pet Products Company, Inc., Denver, CO (US)

( * ) Notice: Subject to any disclaimer, the term of this patent is extended or adjusted under 35 U.S.C. 154(b) by 0 days.

(21) Appl. No.: 09/638,124

(22) Filed: Aug. 14, 2000

(51) Int. Cl.[7] .............................................. A01K 61/02
(52) U.S. Cl. ................................... 119/52.2; 119/57.8
(58) Field of Search ............................... D30/121, 124, D30/125, 128, 133; 119/51.01, 52.1–52.4, 53.5, 54, 57.8, 57.9

(56) References Cited

U.S. PATENT DOCUMENTS

| | | | | |
|---|---|---|---|---|
| 858,543 A | * | 7/1907 | Sickmiller | 200/489 |
| 951,684 A | * | 3/1910 | Gillespie | 47/67 |
| 2,350,922 A | * | 6/1944 | Planeta | 220/485 |
| 2,875,729 A | * | 3/1959 | Gibson | 119/51.01 |
| 2,987,041 A | * | 6/1961 | Bard | 119/51.01 |
| 4,506,475 A | * | 3/1985 | Elliott | 47/67 |
| D290,773 S | * | 7/1987 | Liethen | D30/15 |
| D309,541 S | * | 7/1990 | De Vries et al. | D6/513 |
| D331,647 S | * | 12/1992 | Embree | D30/124 |
| 5,215,040 A | | 6/1993 | Lemley | |
| D347,714 S | * | 6/1994 | Maple et al. | D30/128 |
| 5,682,835 A | * | 11/1997 | Walter et al. | 119/57.8 |
| D399,611 S | | 10/1998 | Ericson et al. | |
| 5,823,135 A | * | 10/1998 | Gilchrist et al. | 119/52.2 |
| D405,289 S | * | 2/1999 | Rosenberg | D6/403 |
| 6,314,674 B1 | * | 11/2001 | Lee | 47/39 |
| 2001/0029899 A1 | * | 10/2001 | Arlitt | 119/77 |

OTHER PUBLICATIONS

A.S. WebSales Corporation. BirdAndYard.com (http://www.birdandyard.com/feeders/h–bird4.htm) "Glass & Wood Hummingbird Feeders." Copyright 1997–2001.*

Catalog entitled "Quality Wild Bird Feeders, Houses, Suets and Accessories 2000", by Perky–Pet Products Co.

* cited by examiner

Primary Examiner—Peter M. Poon
Assistant Examiner—Susan Piascik
(74) Attorney, Agent, or Firm—Timothy J. Martin; Michael R. Henson; Rebecca A. Gegick

(57) ABSTRACT

A bird feeder includes a feed container with a sidewall portion that diverges upwardly from a mouth. A framework nestably receives the container and has first and second support members extending around the container in parallel planes. The first and second support members are interconnected by rigid bars that may be curvilinear in shape. The container mouth attaches to a base that has a passageway with an outer opening that is thus placed in communication with the containers interior. A hanger assembly is used to suspend the feeder from a support. The base may have a plurality of passageways each with an outer opening that are spaced apart from one another. The rigid bars may be decorative, and decorative images may also be disposed on the framework. A method of feeding birds with this feeder is also disclosed.

34 Claims, 8 Drawing Sheets

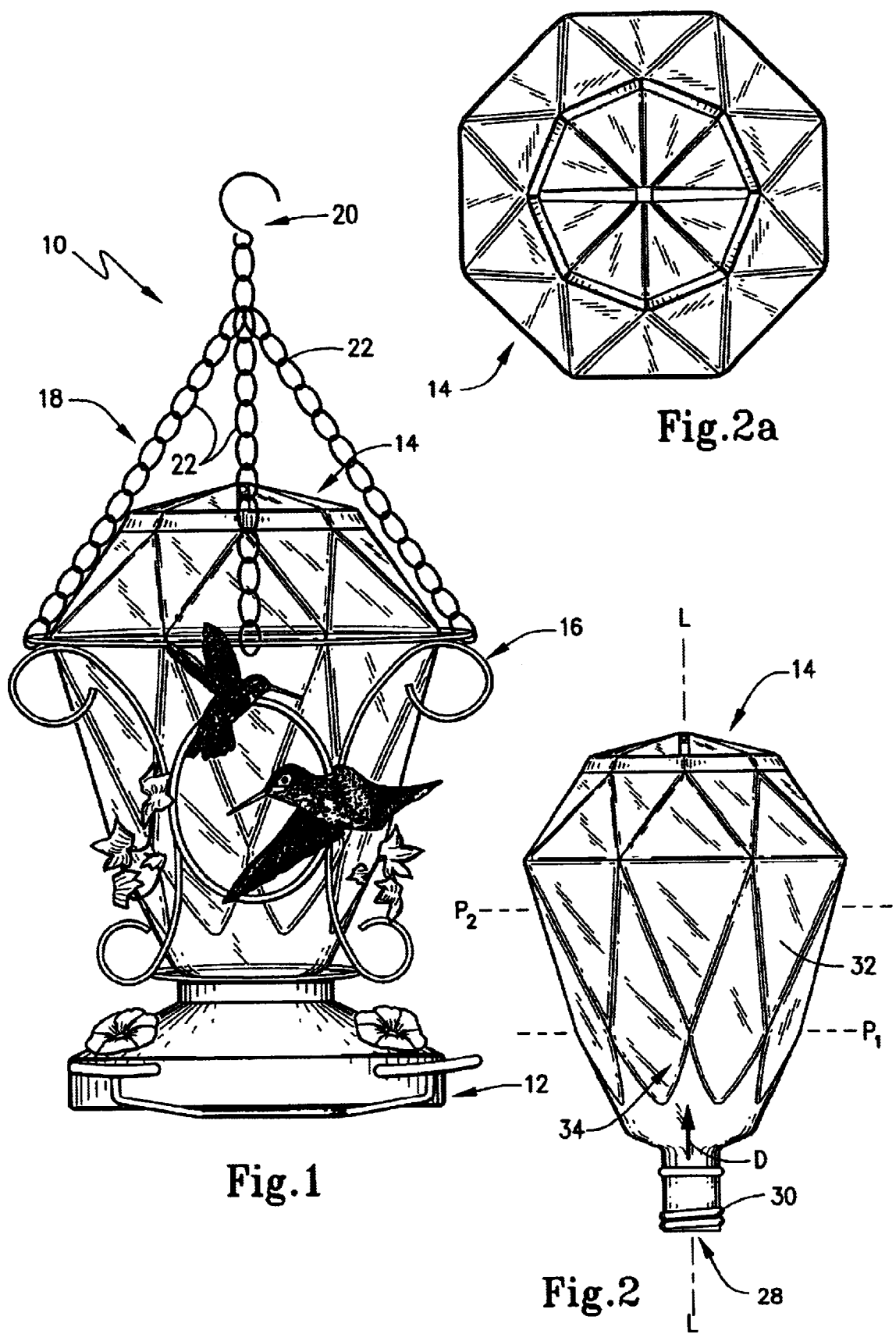

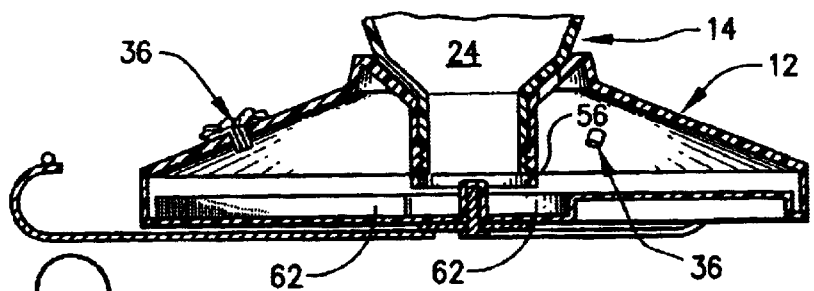
Fig.10
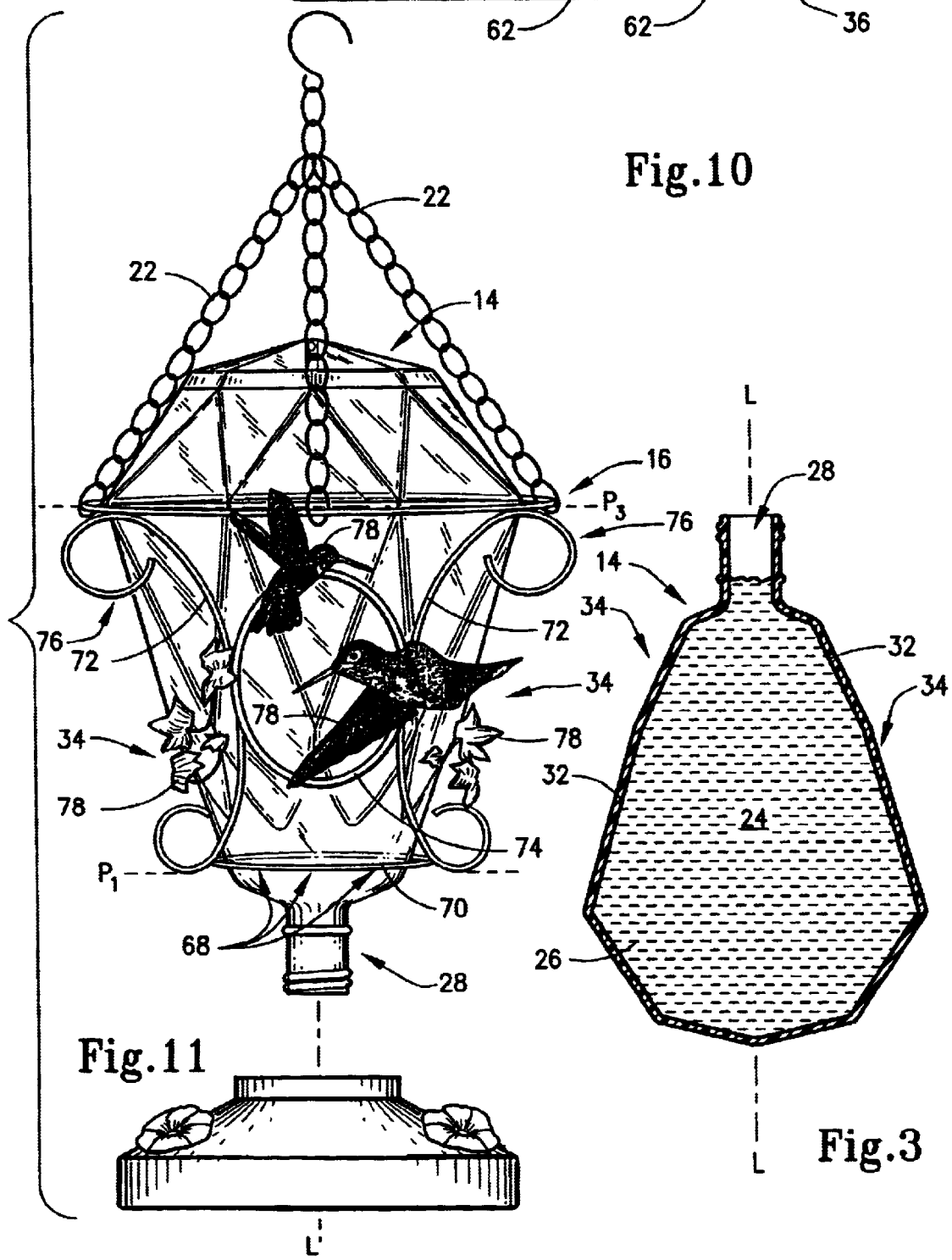
Fig.11
Fig.3

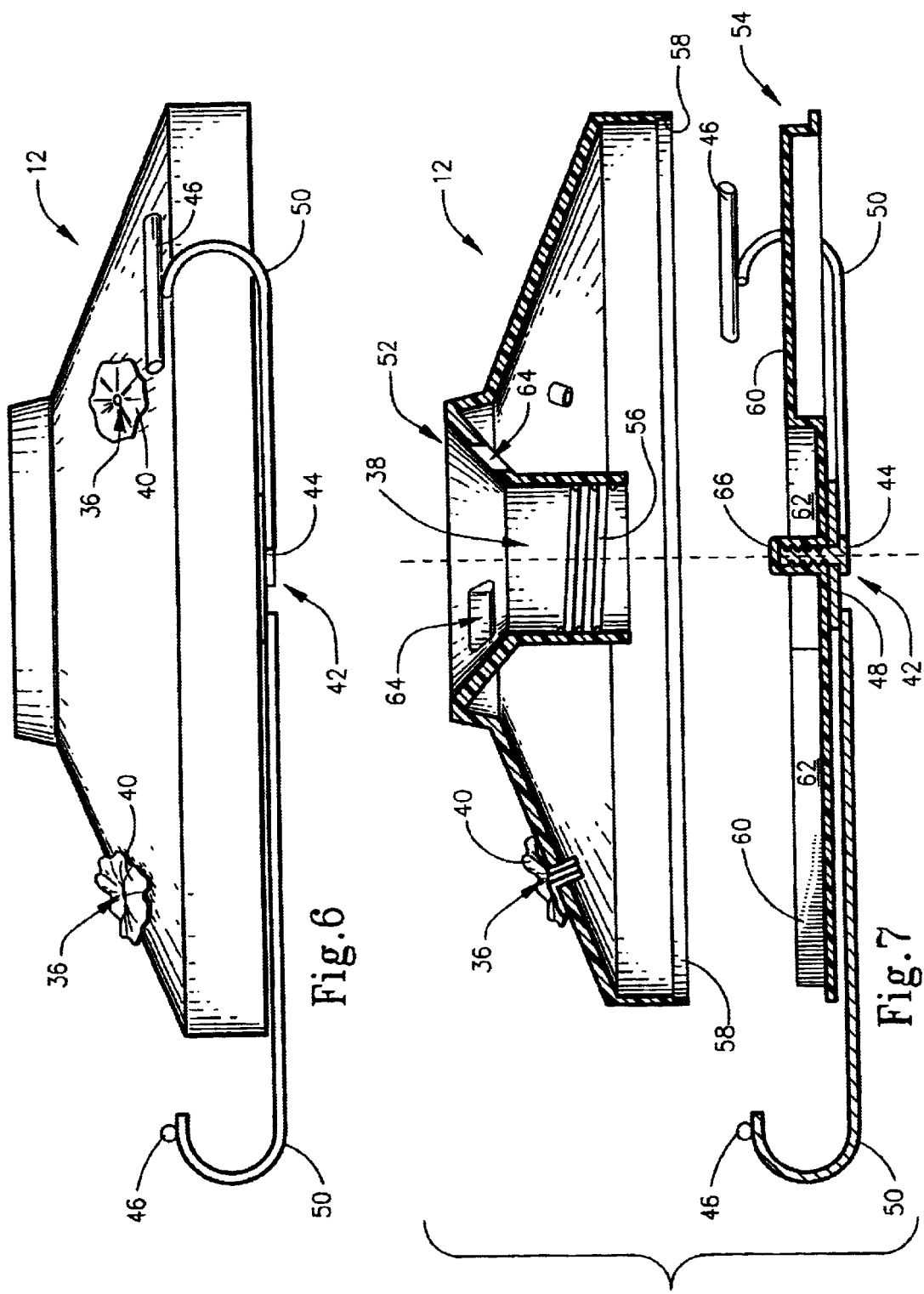

DECORATIVE BIRD FEEDER

FIELD OF THE INVENTION

The present invention generally relates to bird feeders and methods for feeding birds. More particularly, the present invention is directed to decorative bird feeders for providing nectar solutions for consumption by birds. Specifically, the present invention is directed to decorative bird feeders useful for feeding hummingbirds.

BACKGROUND OF THE INVENTION

Bird-watching is a highly prevalent past-time in both urban and rural areas. The world is full of birds of numerous varieties in an astounding array of colors and designs. Many people enjoy viewing birds of various types, and an industry has evolved around products directed to improving the ability of persons to get close to birds. On one hand, many people venture into the outdoors, where binoculars and spotting scopes may be utilized to better view various birds in their natural habitats. Such an approach requires a certain degree of skill, however, in finding and spotting various species of birds. Another approach utilizes various means of attracting birds to one's residence or a desired viewing location, such as adjacent a home porch or window, where birds may be viewed at one's leisure.

In particular, the practice of using bird feeders, bird baths, and the like has arisen to attract birds of various types to one's home. Different types of feeders have been developed that each dispense foodstuffs that are preferred by a selected variety of bird which a person might desire to view. For example, seeds, grains, suets, and nectars are common foodstuffs that can be dispensed by selected types of feeders.

Hummingbirds are one particularly interesting type of bird that persons commonly desire to view. The hummingbird family is found in the Americas, and includes more than 300 species of birds. Hummingbirds are known for their rapid flight and their ability to hover in the air, such as at a food source, and fly backwards (the only birds capable of doing so). In particular, they feed on nectar and tiny insects found within flowers, generally hovering in front of a flower as they reach for food with long, extensible tongues. Their rapid wing beat produces a hum, and they are generally brightly colored and iridescent, thus particularly enjoyable to view. Many male hummingbirds have metallic green coloring with brightly colored throats, which are often a glittering red, blue, or emerald. They are often seen hovering or darting, and have been known to reach speeds up to 60 miles per hour in the air, beating their wings at 50 to 75 beats per second.

Various types of feeders have been developed to attract hummingbirds to a particular location for viewing. Many people hang such feeders from porches or backyard trees, so as to be able to watch various brightly colored birds arrive and depart, hovering or sometimes perching at the feeder in the interim to feed. Due to the enormous energy requirements of their particular flight patterns, hummingbirds require virtually constant feeding of high-sugar content foodstuffs.

Accordingly, it is generally common to provide a nectar-like solution for hummingbirds from a brightly colored feeder designed to simulate the colors of flowers to which hummingbirds are generally attracted, such as red in particular. Such feeders generally include a reservoir and a base that is securable to the reservoir and which includes openings from which a hummingbird can access the nectar. The reservoir is generally filled with a nectar solution, the base is secured thereto, and the entire feeder is inverted and hung from a support. A flexible strap secured to the reservoir is generally used for hanging the feeder.

It is desirable to regularly exchange a fresh nectar solution for an aged solution, and to clean the feeder so as to remove any dirt or microorganism growth thereon. When a feeder is located in a position that receives substantial sunlight, it may especially be desirable to exchange the nectar solution and clean the feeder every few days. However, because of the inverted design of hummingbird feeders, movement thereto—such as in the process of retrieving the feeder from the support—can often cause a substantial amount of the nectar solution to spill out of the feeder. Additionally, wind may cause a feeder to sway on the flexible strap often used for support, which also can cause a substantial amount of nectar solution, to spill from the feeder. In addition to causing unnecessary waste of nectar solution, this situation often creates a sugary residue on the ground or other surface below the feeder, which can attract insects and cause other undesirable unsightliness. Additionally, the often stark appearance of many hummingbird feeders might be undesirable to many persons, such that those persons might not desire to hang such conventional feeders at their residence or other locations.

Accordingly, it can be seen that there remains a need to provide a new and improved hummingbird feeder that provides greater stability and support to the feeder, and which permits the addition of design elements directed to making the feeder more aesthetically appealing to persons desirable of a more attractive feeder appearance. The present invention is directed to meeting these needs.

SUMMARY OF THE INVENTION

It is an object of the present invention to provide a new and useful bird feeder having greater stability and support.

It is another object to provide a bird feeder capable of supporting design elements directed to making the feeder more aesthetically appealing.

A still further object is to provide a bird feeder that minimizes spillage of the contents therein.

It is yet another object to provide a method for feeding birds utilizing an aesthetically appealing apparatus therefor.

According to the present invention, then, a decorative bird feeder is provided which is adapted to be suspended from a support and is operative to store and to dispense a foodstuff to a bird. The decorative bird feeder comprises a base having a passageway with an outer opening, a container, a framework and a hanger assembly. The container has a central longitudinal axis, an interior adapted to receive the foodstuff for a bird and a mouth adapted to be secured to the base such that the passageway in the base establishes communication between the interior of the container with the outer opening accessible to an external environment. The container includes a surrounding side wall with a first side wall portion preferably being divergent in a direction away from the mouth such that it has a smaller dimensional area in a first plane perpendicular to the central axis and a larger dimensional area in a second plane perpendicular to the central axis, where the first plane is located between the mouth and the second plane.

The framework is sized and adapted to nestably receive the first side wall portion of the container and is structured to contact the first side wall portion at a plurality of points sufficient to stabilize the container against wobbling when the container is disposed in the framework and inverted such that the base is located below the container in a manner whereby gravity will convey the foodstuff from the interior of the container into the passageway. The hanger assembly includes a mount adapted to be secured to the support and, preferably, a plurality of suspension members interconnecting the framework and the mount whereby the bird feeder may be suspended from the support.

The framework may include a first support member, such as an annular ring, disposed in the first plane, where the first support member includes an opening sized and adapted to receive a portion of the container that is adjacent to the mouth, and contacts the first side wall portion at a plurality of points. The framework may further include a plurality of rigid bars extending from the first support member, and adjacent ones of the rigid bars may be interconnected by curvilinear bars to provide a rigid filigree framework. A portion of a selected rigid bar may be adapted to connect the framework to a selected suspension member.

The decorative bird feeder may further include a perch structure having a perch disposed proximately to the outer opening of the passageway. The base may have a plurality of passageways each with an outer opening, and the perch structure may include a plurality of perches arranged so that there is a perch disposed proximately to the outer opening of each of the passageways when the perch structure is connected to the base. The passageways may be equiangularly spaced in the base such that they arrive at a common inner opening in the base, and the perches may be arranged so that they are equiangularly spaced therearound.

The base may include a threaded mount proximate to the inner opening and the mouth of the container may be cooperatively threaded whereby it may be screwedly secured to the threaded mount of the base. The perch structure may include a central perch connector including a plurality of perch supports extending radially outward therefrom. A selected perch may be disposed on a distal portion of a respective perch support, and each perch support may curve upwardly when the perch structure is connected to the base. The base may be circular in cross-section and each perch may extend parallel to a line tangential to the base.

The framework may be structured to contact the first side wall portion at least at four contact points that are not all in a common plane, and the framework may include a first support member and a second support member disposed in respective planes. There may be a plurality of suspension members, and each is preferably flexible and may be formed to include a plurality of interconnected rigid links. The container may have a different geometrical shape in the first plane than it does in the second plane.

Additionally, the present invention is directed to a method of feeding birds that comprises the steps of at least partially filling a container through a mouth thereof with a foodstuff for a bird, nesting the container in a framework, securing a base to the mouth of the container to define a secured state wherein the base is sized to prevent removal of the framework, inverting the container and the framework, and suspending the framework from a support so that the container and base are correspondingly suspended from the support in an inverted orientation.

These and other objects of the present invention will become more readily appreciated and understood from a consideration of the following detailed description of the exemplary embodiments of the present invention when taken together with the accompanying drawings, in which:

BRIEF DESCRIPTION OF THE DRAWINGS

FIG. 1 is a front view in slight perspective of a decorative bird feeder according to the present invention;

FIG. 2 is a front plan view of a container for use with the bird feeder of the present invention;

FIG. 2A is a top plan view of the container of FIG. 2;

FIG. 3 is an inverted cross-sectional view showing the container of FIGS. 2 and 2A filled with foodstuff;

FIG. 6 is a front view in elevation of the base and perch structure shown in FIG. 4;

FIG. 7 is a partially exploded cross-sectional view about lines 7—7 of FIG. 4;

FIG. 10 is a cross-sectional view showing the base, perch structure, and container secured in the manner of the present invention;

FIG. 11 is a partially exploded front view in slight perspective of the bird feeder according to the present invention without a perch structure;

DETAILED DESCRIPTION OF THE EXEMPLARY EMBODIMENTS

Figure 4:
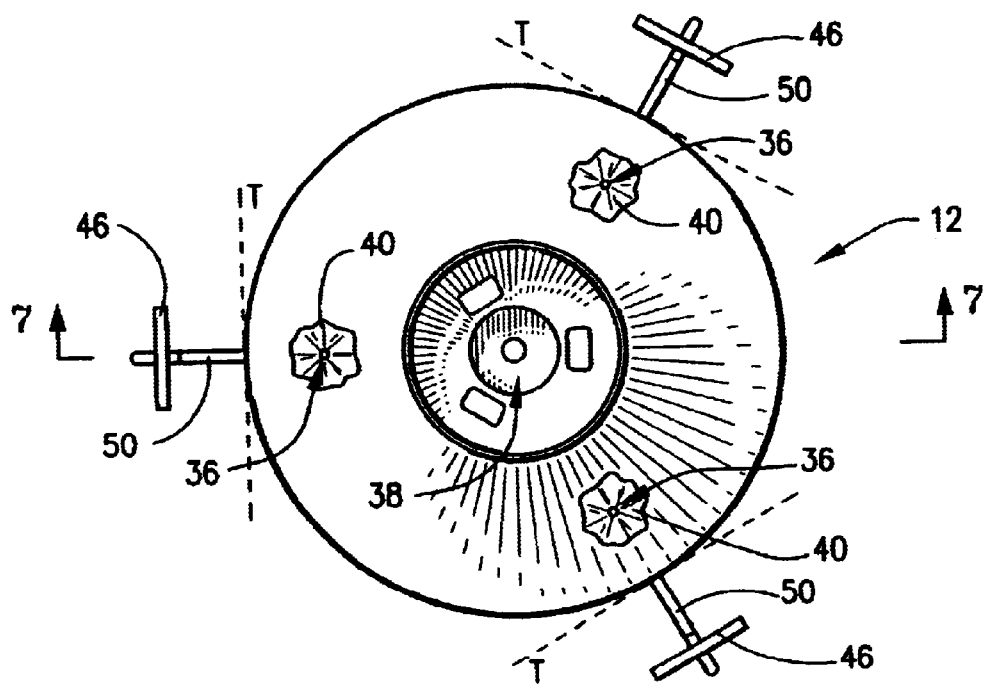
FIG. 4 is a top plan view of the base and perch structure for the bird feeder of the present invention.
Figure 5:
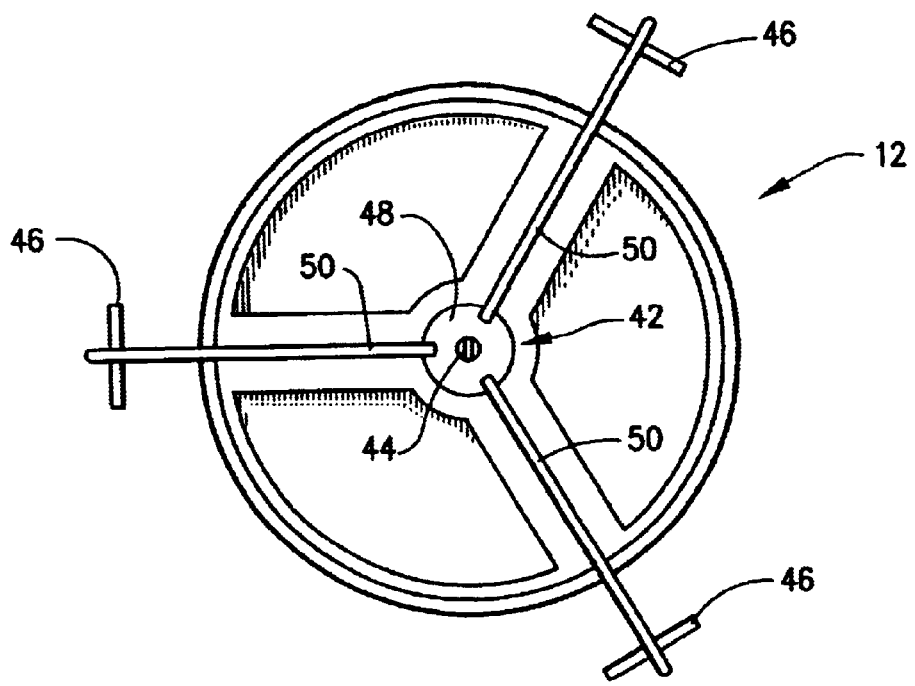
FIG. 5 is a bottom plan view of the base and perch structure shown in FIG. 4.

The present invention relates to decorative bird feeders that are adapted to be suspended from a support, such as a porch or wall-mounted hook or other device for receiving a hanging apparatus connected thereto. In particular, the present invention is directed to bird feeders adapted to dispense a foodstuff, such as a nectar solution, to various types of birds, and in particular various types of hummingbirds. However, while this invention is described in the context of a hummingbird feeder, it should be understood that feeders for other types of birds are within the scope of this disclosure.

Turning to FIG. 1, it can be seen that a decorative bird feeder 10 according to the present invention includes a base 12, a container 14, and a framework 16 that nestably receives the container. A hanger assembly 18 includes a mount 20, such as a hook or other fastener adapted to be secured to a support, and a plurality of suspension members 22 interconnecting framework 16 and mount 20. Suspension members 22 may be flexible chains that include a plurality of interconnected rigid links, or may be other flexible or rigid structures extending between mount 20 and framework 16, such as string, wire or the like.

As shown in FIGS. 2, 2A and 3, container 14, which may be formed of glass, plastic or the like, has a central longitudinal axis L, and may have a generally octagonal shape in cross-section, although other polygonal, circular or oval shaped containers are contemplated. A similar container 14 for use in the present invention is disclosed in U.S. Pat. No. Des. 399,611 to Ericson et al., and the teachings thereof are incorporated herein by reference. An interior 24 of container 14 is adapted to receive a foodstuff 26, such as a nectar solution. A mouth 28 in communication with interior 24 may have threading 30 such that it may be screwedly secured to a cooperatively threaded structure associated with base 12, as discussed below with respect to FIG. 10. It should be appreciated that threading 30 may be interior or exterior of mouth 28, as appropriate. Container 14 includes a surrounding sidewall 32.

A first side wall portion 34 of container 14 is divergent in a direction D away from mouth 28. In particular, container 14 has a smaller dimensional area in a first plane P1 that is perpendicular to central axis L and a larger dimensional area in a second plane P2 that is also perpendicular to central axis L, where plane P1 is located between mouth 28 and plane P2. It should be appreciated that the dimensional areas of container 14 in planes P1 and P2 are bounded by respective perimeters of container 14 that may each be configured as polygons, and which may be of the same or different polygonal shapes. Alternatively, it should be appreciated that container 14 may be circular or oval in cross-section, such that the dimensional areas of container 14 in planes P1 and P2 bounded by respective perimeters of container 14 are circular or oval in shape. Additionally, it should be appreciated that first side wall portion 34 may be adjacent to mouth 28 or may be spaced apart from mouth 28 and interconnected therewith by an extension of side wall 32.

Figure 9:
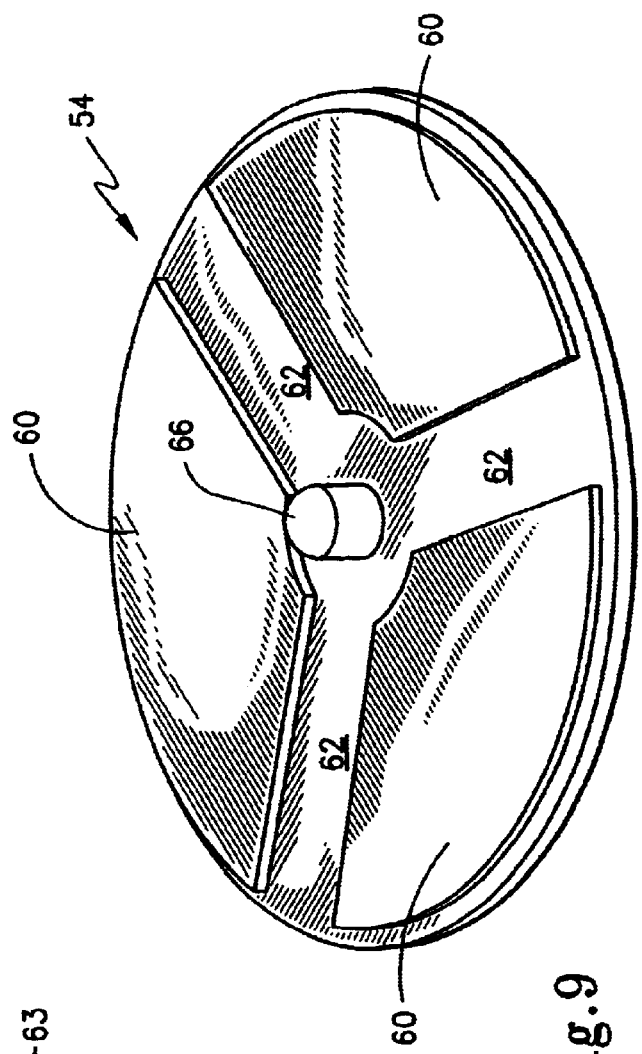
FIG. 9 is top perspective view of the base plate shown in FIG. 7.

As shown in FIGS. 4 through 7, base 12, which may be formed of metal, plastic and the like, is preferably generally circular in cross-section, and preferably includes a plurality of outer openings 36 and an inner opening 38. Outer openings 36 may be bounded by flower structures 40 to make base 12 more attractive to hummingbirds. A perch structure 42 is connectable to base 12, such as by a screw 44. A central projection 66 in base plate 54 of base 12 may be formed to receive screw 44 for connecting perch support 42 thereto (as shown in FIGS. 7 and 9). It should be appreciated, however, that perch structure 42 may alternatively be permanently affixed or integrally molded to base 12. Perch structure 42 may include a central perch connector 48, such as a metal disc, and includes perches 46 disposed proximately to respective outer openings 36 when the perch structure 42 is connected to base 12.

Perches 46 may be disposed on distal portions of perch supports 50 which themselves extend radially outwardly from central perch connector 48. In particular, perch supports 50 may be equiangularly spaced around central perch connector 48 such that perches 46 are arranged so that they are equiangularly spaced around base 12. It is further preferred that each perch 46 extends parallel to a respective line T tangential to base 12, as shown in FIG. 4. As shown in FIGS. 6 and 7, each perch support 50 may curve upwardly when perch structure 42 is connected to base 12, although it should be appreciated that various decorative looping and curving variations of the perch supports 50 are contemplated. Various materials such as metal, plastic and the like may be utilized to form perch structure 42.

As shown in FIG. 7, base 12 may be a two-piece construction that includes a main body 52 and a base plate 54. Base plate 54 may be held in position by frictional engagement with groove 58 running around the inner perimeter margin of main body 52. Base plate 54 is aligned to main body 52 by posts 53 which extend from main body 52 into one of passageways 62 of base plate 54 when properly aligned. Main body 52 includes a threaded mount 56 proximate to inner opening 38. Threaded mount 56 is cooperatively threaded for, and is sized and adapted to engage, threading 30 on mouth 28 of container 14 shown in FIG. 2, such that container 14 may be screwedly secured to threaded mount 56 of base 12.

Figure 8:
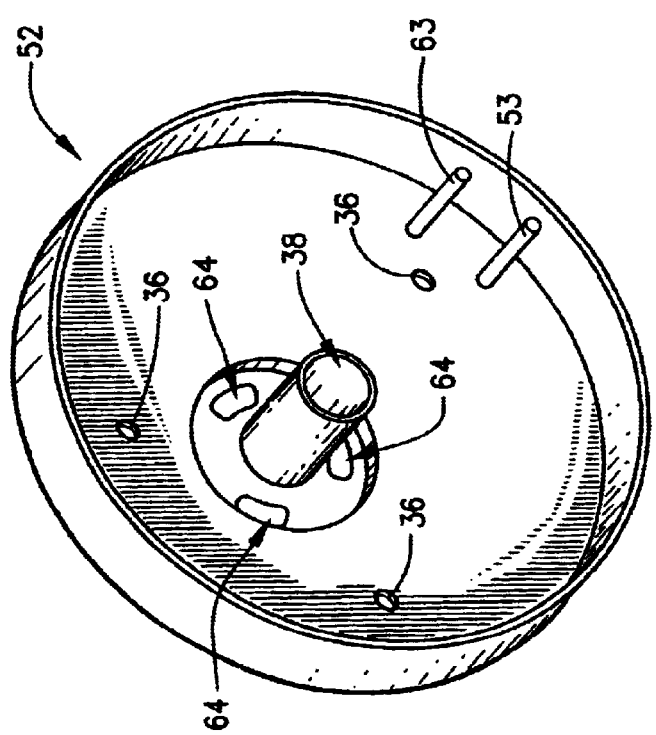
FIG. 8 is a bottom perspective view of the base main body shown in FIG. 7.

As shown in FIGS. 8 and 9, base plate 54 includes a plurality of spaced projections 60 extending upwardly, such that when base plate 54 is connected to main body 52, a plurality of passageways 62 are formed which intersect at common inner opening 38 of base 12. Spaced projections 60 are preferably integrally molded with base plate 54, and passageways 62 are preferably equiangularly spaced in base 12. As apparent from FIGS. 7 through 9, each passageway communicates with a respective outer opening 36 in base 12.

Accordingly, as illustrated in FIG. 10, it can be seen that when container 14 is screwed into threaded mount 56 of base 12, and container 14 and base 12 are inverted such that base 12 is located below container 14, passageways 62 establish communication between the interior 24 of container 14 and the outer openings 36 that are accessible to the external environment, such that nectar solution can be received in passageways 62 from interior 24, and can be accessed by a bird through outer openings 36. In particular, gravity conveys the nectar from the interior 24 of the container 14 into passageways 62. Additionally, as shown in FIGS. 7 and 8, main body 52 may include one or more air holes 64 communicating with an external environment and operative to release pressure that might build up inside passageways 62 such as by heating of a nectar solution disposed therein when base 12 is exposed to sunlight, thereby to prevent nectar from being inadvertently forced out of openings 36.

Figure 12:
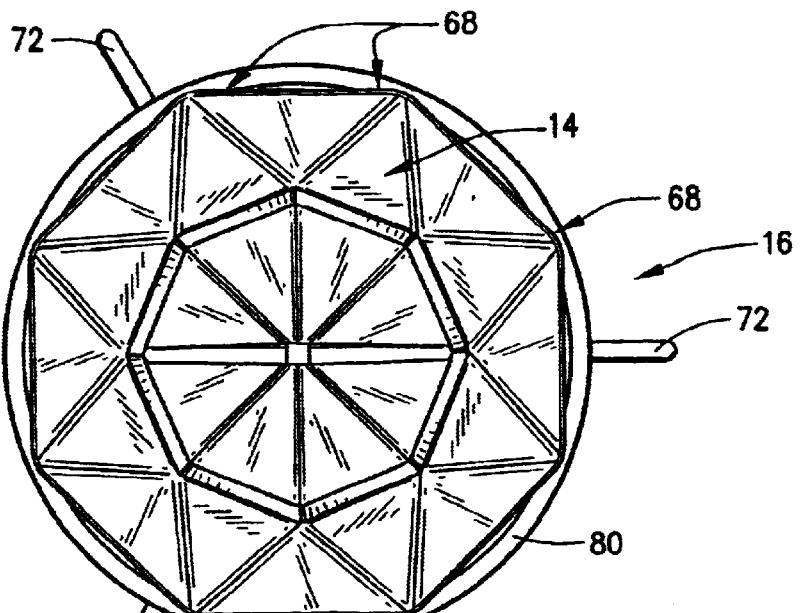
FIG. 12 is a top plan view showing a container nestably received in a framework according to FIG. 11.
Figure 13:
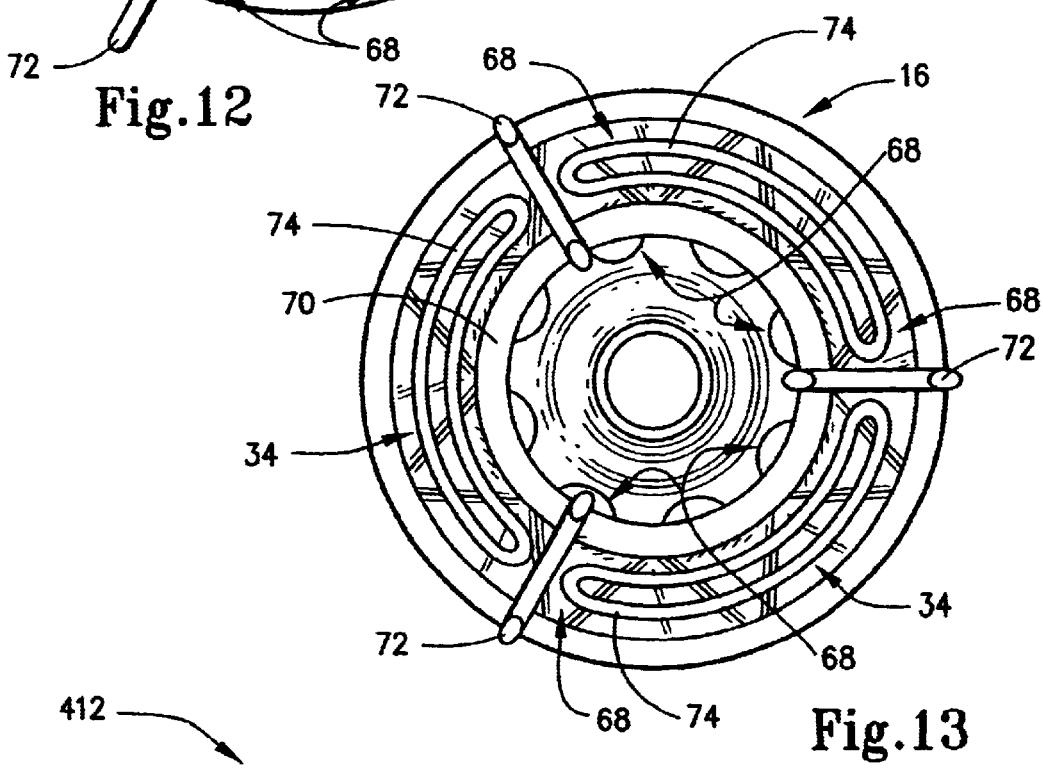
FIG. 13 is a bottom plan view of the container and framework of FIG. 12 without the design elements disposed thereon.

Turning to FIG. 11, it can be seen that framework 16 is sized and adapted to nestably receive the first side wall portion 34 of container 14. Framework 16 is preferably formed of metal wires configured into a desired pattern and secured together by conventional methods, such as spot-welding. As shown in FIGS. 11 through 13, framework 16 is structured to contact the first side wall portion 34 at a plurality of points 68. Framework 16 preferably contacts first side wall portion 34 at at least 4 points that are not all in a common plane, thereby to provide stability to container 14. In particular, framework 16 is structured such that it stabilizes container 14 against wobbling when container 14 is disposed in the framework. Framework 16 may specifically include a first support member 70 disposed in first plane P1 or a plane parallel thereto, such as an annular ring that has an opening sized and adapted to receive a portion of the container that is adjacent to mouth 28. It is desired that the first support member 70 contact first side wall portion 34 at a plurality of points 68. A plurality of rigid bars 72 may extend from the first support member 70, and may be interconnected by curvilinear bars 74 to provide a rigid filigree framework. It should be appreciated that rigid bars 72 and curvilinear bars 74 may be configured in a variety of configurations and patterns structured to contact first side wall portion 34. For example, rigid bars 72 may themselves be curvilinear, as shown in FIG. 11. Additionally, a portion 76 of one or more rigid bars 72 may be adapted to connect the framework to a selected suspension member 22.

Framework 16 may additionally include a second support member 80, such as a second annular ring disposed in a plane P3 perpendicular to longitudinal axis L and spaced apart from plane P1. Further, framework 16 may include various design elements 78 such as images of flowers, leaves, birds, and the like, designed to camouflage the bird feeder thereby to make it both more aesthetically pleasing and more attractive to various birds. Perches may additionally be decorated with perch design elements to create a coordinated theme with framework 16. It is preferred that framework 16 is formed generally radially symmetrically such that rigid bars 72 extend generally equiangularly around container 14 and the pattern of curvilinear bars 74 and design elements 78 repeat between adjacent ones of rigid bars 72.

Figure 14:
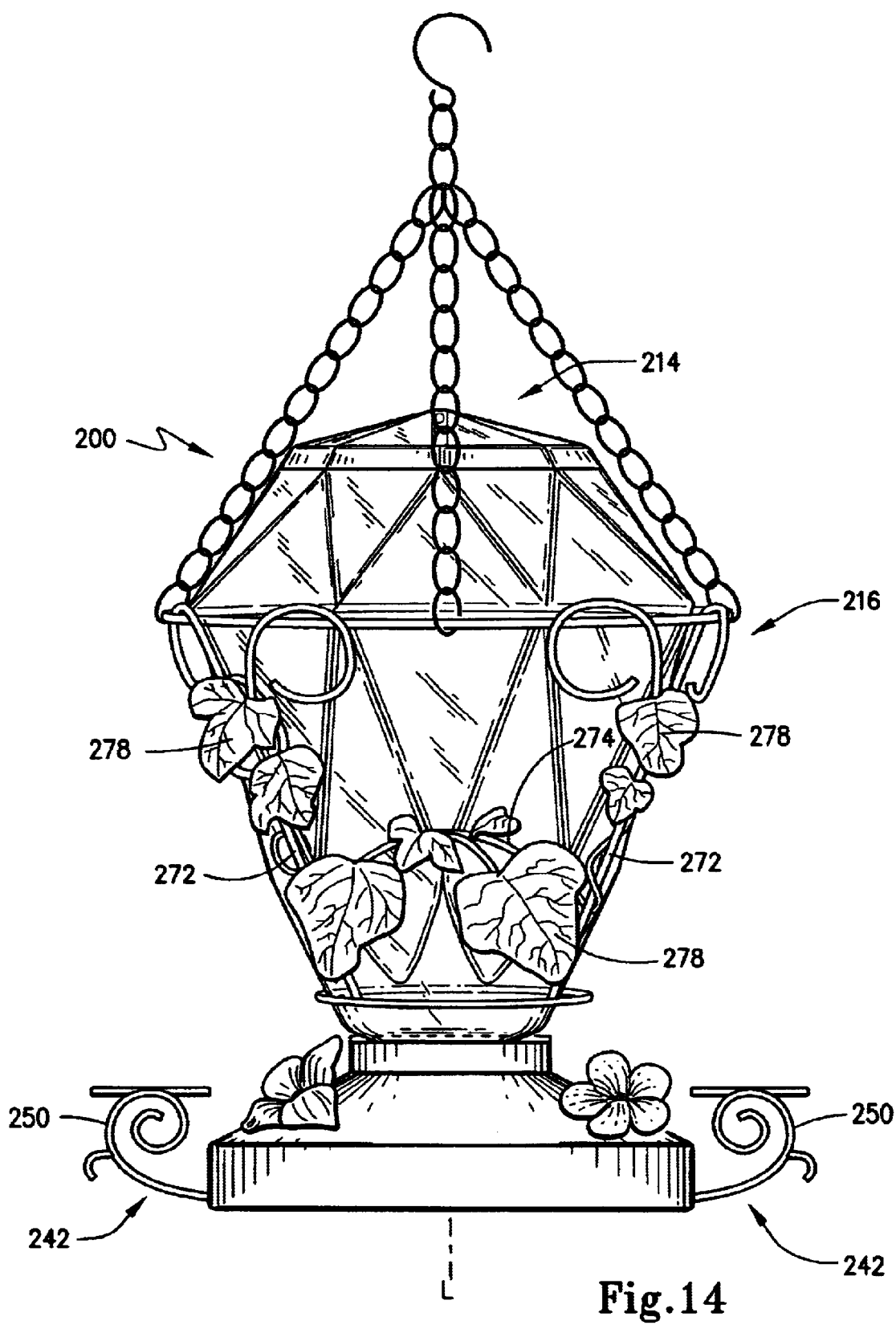
FIG. 14 is a front view in slight perspective of a second embodiment of a bird feeder according to the present invention.

A second embodiment 200 of a bird feeder according to the present invention is shown in FIG. 14. Here framework 216 includes a different configuration of rigid bars 272 and curvilinear bars 274. Further, here design elements 278 comprise images of leaves which are disposed on framework 216 to camouflage bird feeder 200. Additionally, perch structures 242 include an intricate design which coordinates with the design of framework 216. In particular, perch supports 250 are formed of the same type of bent wire used in the formation of framework 216.

Figure 15:
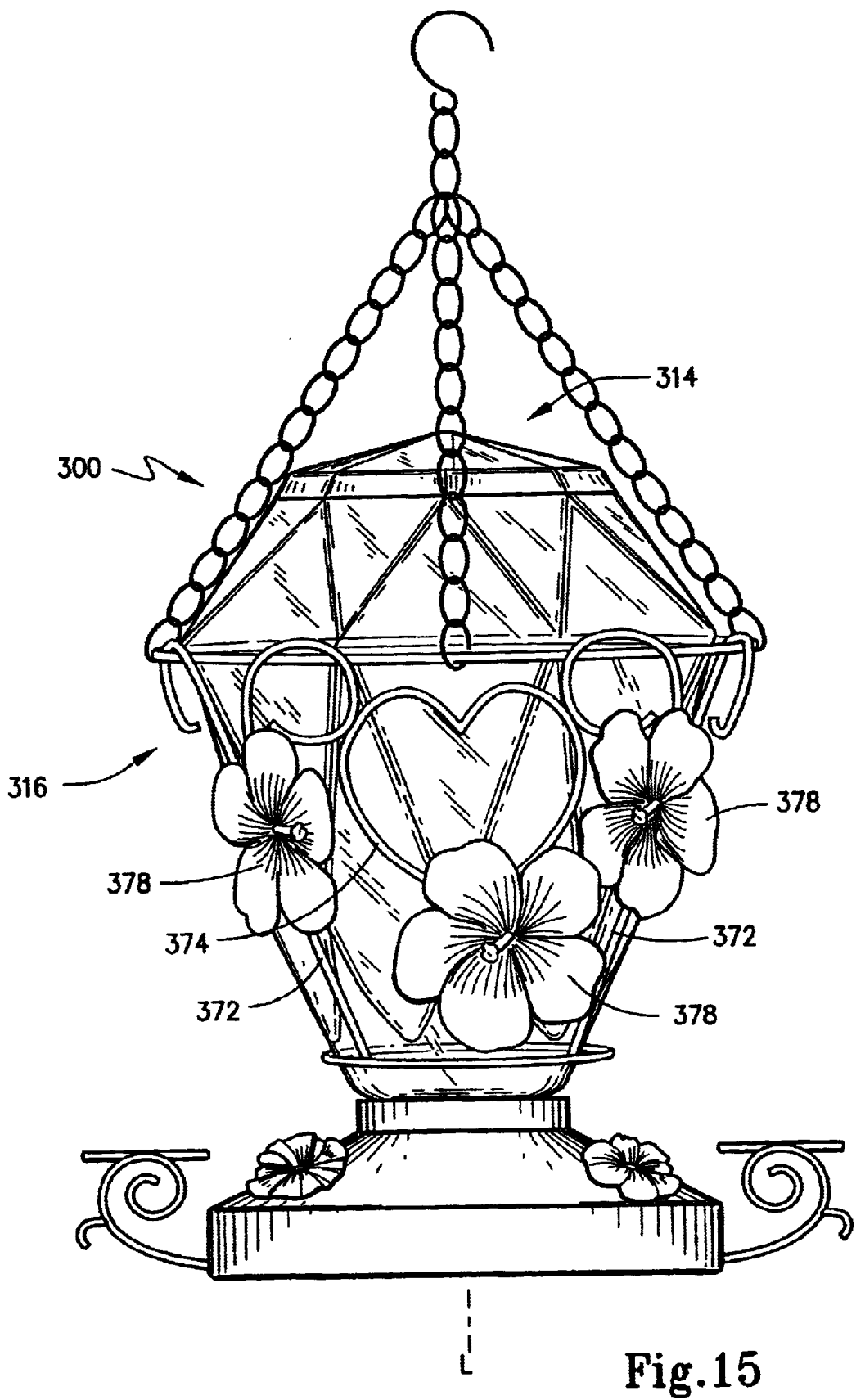
FIG. 15 is a front view in slight perspective of a third embodiment of a bird feeder according to the present invention.

Turning to FIG. 15, a third embodiment 300 of a bird feeder according to the present invention is shown. Again, the configuration of framework 316 is modified. In particular, curvilinear bars 374 form a geometric shape, such as a heart. Additionally, this embodiment lacks a second top support structure, such as an annular ring, in a plane perpendicular to the longitudinal axis L of the container 314. Here design elements 378 comprise images of flowers.

It should be appreciated that in FIGS. 14 and 15, each embodiment of framework 216 and framework 316, respectively, are each preferably generally radially symmetrical around longitudinal axis L, such that rigid bars 272 and 372 respectively extend generally equiangularly around container 214, 314 and the pattern of curvilinear bars 274, 374 and design elements 278, 378 repeat between adjacent ones of rigid bars 272, 372. It should be understood, however, that the frameworks according to the present invention may be formed in an asymmetrical manner, as desired.

Figure 16:
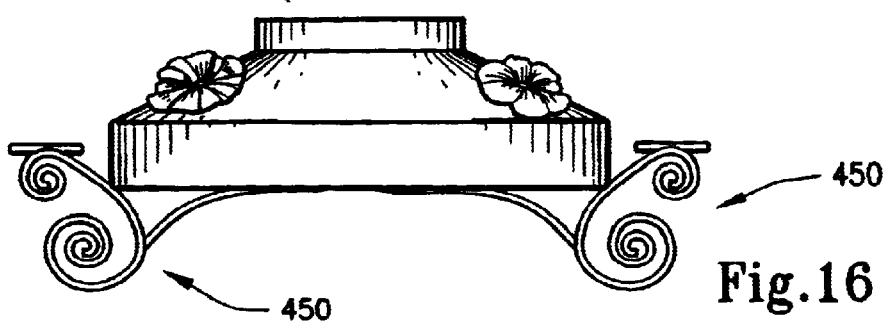
FIG. 16 is a front plan view of an alternative construction for a perch structure for use with any of the bases for the bird feeder of the present invention.

FIG. 16 shows a further embodiment of a base 412 according to the present invention. In particular, perch supports 450 are configured in an intricate design from pieces of metal wire.

It should be appreciated from the foregoing that the present invention may generally include decorative bird feeders that are adapted to be suspended from a support in a suspended state and are operative to store and to dispense a foodstuff to a bird. Such bird feeders may generally comprise a base, a container, a framework and a hanger assembly. While the preferred containers include a divergent side wall portion, it should be appreciated that other configurations of containers are contemplated where the framework is generally sized and adapted to surround at least a portion of the surrounding side wall of the container when the container is in the inverted orientation. Configurations contemplated include frameworks which may be secured or securable to various portions of the feeder, such as the base or the container.

It should additionally be apparent from the foregoing that the present invention lends itself to a method of feeding birds. In particular, a container may be at least partially filled through a mouth thereof with a foodstuff for a bird, such as a nectar solution for hummingbirds. The container may then be nested in a framework according to the present invention that is structured to contact the container at a plurality of points, as described above. In particular, the framework may be generally congruent with the first side wall portion of the container. A base as described above may thereafter be secured to the mouth of the container, such as by screwing the threading of the container into a threaded mount in the base. The base is preferably, sized to prevent removal of the framework, such that the framework becomes entrapped on the bird feeder when the base is secured to the mouth of the container. The container and framework may thereafter be inverted such that the base is located below the container whereby gravity conveys the foodstuff from the interior of the container through a passageway in the base. Finally, the framework may be suspended, such as by a hanger assembly, from a support such that the container and base are correspondingly suspended from the support in an inverted orientation.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A decorative bird feeder adapted to be suspended from a support and operative to store and to dispense a foodstuff to a bird, comprising:

(a) a base having a passageway with an outer opening;
   (b) a container having a central longitudinal axis, an interior adapted to receive the foodstuff for a bird and a mouth adapted to be secured to said base such that the passageway in said base establishes communication between the interior of the container with the outer opening accessible to an external environment, said container including a surrounding side wall with a first side wall portion being divergent in a direction away from said mouth such that it has a smaller dimensional area in a first plane perpendicular to the central axis and a larger dimensional area in a second plane perpendicular to the central axis, said first plane being located between said mouth and the second plane;
   (c) a framework sized and adapted to nestably receive said container in a nested state, said framework including a first support member disposed in the first plane and extending around said container when in the nested state and a second support member disposed in a second plane that is generally parallel to the first plane and extending around said container when in the nested state, said framework further including a plurality of curvilinear rigid bars interconnecting said first support member and said second support member and extending longitudinally alongside said first side wall portion of said container when said container is in the nested state so as to contact said first side wall portion at a plurality of points sufficient to stabilize said container against wobbling when said container is disposed in said framework and inverted such that said base is located below said container in a manner whereby gravity will convey the foodstuff from the interior of the container into the passageway; and
   (d) a hanger assembly including a mount adapted to be secured to the support and a plurality of suspension members interconnecting said framework and said mount whereby the bird feeder may be suspended from the support.

2. A decorative bird feeder according to claim 1 wherein said first support member includes an opening sized and adapted to receive a portion of said container that is adjacent to said mouth.

3. A decorative bird feeder according to claim 2 wherein said first support member contacts said first side wall portion at a plurality of points.

4. A decorative bird feeder according to claim 2 wherein said first support member is annular in shape.

5. A decorative bird feeder according to claim 1 wherein a portion of a selected rigid bar is adapted to connect said framework to a selected suspension member.

6. A decorative bird feeder according to claim 1 wherein each rigid bar is curvilinear.

7. A decorative bird feeder according to claim 1 wherein said first side wall portion is proximate to said mouth.

8. A decorative bird feeder according to claim 1 including a perch structure having a perch disposed proximately to the outer opening of said passageway.

9. A decorative bird feeder according to claim 8 wherein said framework includes at least one framework design element and wherein said perch structure includes at least one perch design element, and wherein said framework design element and said perch design element create a coordinated theme.

10. A decorative bird feeder according to claim 1 wherein said perch structure is releasably attached to said base.

11. A decorative bird feeder according to claim 1 wherein the smaller dimensional area in the first plane and the larger dimensional area in the second plane are bounded by respective perimeters of said container that are each configured as a polygon.

12. A decorative bird feeder according to claim 1 including a channel portion associated with the passageway of said base, said channel portion sized and adapted to nestably receive a portion of said container when secured to said base.

13. A decorative bird feeder according to claim 1 wherein said base further includes at least one air hole communicating with the external environment.

14. A decorative bird feeder adapted to be suspended from a support and operative to store and to dispense a foodstuff to a bird, comprising:

(a) a base having a plurality of passageways each with a discrete outer opening with the outer openings being spaced apart from one another;

(b) a container having a central longitudinal axis, an interior adapted to receive a foodstuff for a bird and a mouth adapted to be secured to said base such that each of the passageways in said base establishes communication between the interior of the container with each respective outer opening accessible to an external environment, said container including a surrounding side wall with a first side wall portion being divergent in a direction away from said mouth such that it has a smaller dimensional area in a first plane that perpendicular to the central axis and a larger dimensional area in a second plane perpendicular to the central axis, said first plane being located between said mouth and the second plane;

(c) a framework sized and adapted to nestably receive said container in a nested state, said framework including a first support member disposed in the first plane and extending around said container when in the nested state, said framework further including a plurality of rigid bars connected to said first support member and extending longitudinally alongside said first side wall portion of said container when said container is in the nested state so as to contact said first side wall portion at a plurality of points sufficient to stabilize said container against wobbling when said container is disposed in said framework and inverted such that said base is located below said container in a manner whereby gravity will convey the foodstuff from the interior of the container into the passageway;

(d) a plurality of decorative images disposed on said framework;

(e) a perch structure connectable to said base and including a plurality of perches arranged so that there is a perch disposed proximately to the outer opening of each of the passageways when said perch structure is connected to said base; and (f) a hanger assembly including a mount adapted to be secured to the support and a plurality of suspension members interconnecting said framework and said mount whereby the bird feeder may be suspended from the support.

15. A decorative bird feeder according to claim 14 wherein said passageways are equiangularly spaced in said base, said passageways arriving at a common inner opening in said base.

16. A decorative bird feeder according to claim 15 wherein said perches are arranged so that they are equiangularly spaced around said base.

17. A decorative bird feeder according to claim 15 wherein said base includes a threaded mount proximate to said inner opening and wherein said mouth of said container is threaded whereby it may be screwedly secured to said threaded mount of said base.

18. A decorative bird feeder according to claim 15 wherein said perch structure includes a central perch connector including a plurality of perch supports extending radially outward therefrom, and wherein a selected perch is disposed on a distal portion of a respective perch support.

19. A decorative bird feeder according to claim 18 wherein each said perch support curves upwardly when said perch structure is connected to said base.

20. A decorative bird feeder according to claim 18 wherein said base is circular in cross-section and wherein each perch extends parallel to a line tangential to said base.

21. A decorative bird feeder adapted to be suspended from a support and operative to store and to dispense a foodstuff to a bird, comprising:

(a) a base having a plurality of passageways each provided with an a discrete outer opening;

(b) a container having a central longitudinal axis, an interior adapted to receive a foodstuff for a bird and a mouth adapted to be secured to said base such that the passageway in said base establishes communication between the interior of the container with the outer opening accessible to an external environment, said container including a surrounding side wall with a first side wall portion being divergent in a direction away from said mouth such that it has a smaller dimensional area in a first plane perpendicular to the central axis and a larger dimensional area in a second plane perpendicular to the central axis, said first plane being located between said mouth and the second plane;

(c) a framework sized and adapted to nestably receive said first side wall portion of said container in a nested state, said framework including a first support member disposed in the first plane and extending around said container when in the nested state, said framework further including a plurality of rigid bars connected to said first support member and extending longitudinally alongside said first side wall portion at least at four contact points when said container is in the nested state said framework having a lower opening sized so that a portion of said container protrudes out of said framework through the lower opening for attachment to said base when said container is in the nested state with said base located below said container in a manner whereby gravity will convey the foodstuff from the interior of the container into the passageway, wherein one of said four contact points is in a different plane from the other three points; and (d) a hanger assembly including a mount adapted to be secured to the support and a plurality of suspension members interconnecting said framework and said mount whereby the bird feeder may be suspended from the support.

22. A decorative bird feeder according to claim 21 wherein said first support member sized and adapted to contact said first side wall portion at least at three points in said first plane.

23. A decorative bird feeder according to claim 22 wherein said framework includes a second support member disposed in said second plane, said second support member sized and adapted to contact said first side wall portion at least at one contact point in said second plane.

24. A decorative bird feeder according to claim 21 wherein said suspension members are flexible.

25. A decorative bird feeder according to claim 24 wherein said suspension members include a plurality of interconnected rigid links.

26. A decorative bird feeder according to claim 21 wherein said container has a different geometrical shape in said first plane than it does in said second plane.

27. A method of feeding birds, comprising the steps of:

(a) at least partially filling a container through a mouth thereof with a foodstuff for a bird wherein said container has a central longitudinal axis, a surrounding side wall with a first side wall portion proximate to said mouth and an interior adapted to receive a foodstuff for a bird, said first side wall portion being divergent in a direction away from the mouth such that it has a smaller dimensional area in a first plane perpendicular to the central axis and a larger dimensional area in a second plane perpendicular to the central axis, said first plane being located between said mouth and the second plane;

(b) nesting said container in a framework that is structured to contact said first side wall portion at a plurality of points when said container is nested therein and with a portion of said container protruding out of said framework through a lower opening for attachment to said base when said container is nested in said framework;

(c) thereafter securing a base to the mouth of said container to define a secured state wherein said base is sized to prevent removal of the framework and wherein said base has a passageway with an outer opening such that the passageway establishes communication between the interior of the container with the outer opening accessible to an external environment;

(d) thereafter inverting said container and said framework such that said base is located below said container in a manner whereby gravity will convey the foodstuff from the interior of the container and through the passageway; and (e) thereafter suspending the framework from a support so that said container and base are correspondingly suspended from said support in an inverted orientation.

28. A method according to claim 27 wherein the step of filling the container includes filling the container with a nectar solution.

29. A method according to claim 27 wherein the step of nesting said container in a framework includes disposing said container in a framework sized such that a portion of said framework has a geometry generally congruent with said first side wall portion of said container.

30. A method according to claim 27 wherein the step of nesting said container in a framework includes disposing said container in a framework formed of a plurality of curvilinear bars interconnected to provide a rigid frame.

31. A method according to claim 27 wherein the step of nesting said container in a framework includes disposing said container in a framework that includes a first support member having an opening therein that has a diameter greater than a diameter of said mouth of said container and less than a diameter of said base.

32. A method according to claim 27 wherein the step of securing said base to said mouth is accomplished by screwing a threaded portion of said mouth onto a threaded mount in said base.

33. A method according to claim 27 wherein the step of suspending the framework from a support is accomplished by attaching a hanger assembly to said framework and said support.

34. A decorative bird feeder adapted to be suspended form a support in a suspended state and operative to store and to dispense a foodstuff to a bird, comprising:

(a) a base having a plurality of passageways each in fluid communication with a discrete outer opening that is accessible to an external environment;

(b) a container having an open mouth at a first longitudinal end and a surrounding side wall which extends from said mouth to terminate at a closed second longitudinal end thereby to define a container interior that is adapted to receive the foodstuff, said mouth securable to said base such that when the container is in an inverted orientation wherein the base is located below said container, gravity will convey the foodstuff from the interior of the container into the passageway;

(c) a framework sized and adapted to receive said container in a nested state, said framework including a plurality of curvilinear rigid bars interconnecting extending longitudinally alongside said side wall of said container when said container is in the nested state, said framework being supportable relative to said base when said bird feeder is in the suspended state;

(d) at least one decorative image disposed on said framework; and (e) a hanger assembly including a mounting portion adapted to be secured to the support and a suspension member interconnecting said framework and said mounting portion thereby to suspend said bird feeder relative to said support.

* * * * *